United States Patent [19]
Wilson

[11] Patent Number: 5,497,434
[45] Date of Patent: Mar. 5, 1996

[54] IMAGE DATA COMPRESSION

[75] Inventor: Alun R. Wilson, Cambridge, United Kingdom

[73] Assignee: Acorn Computers Limited, Cambridge, United Kingdom

[21] Appl. No.: 312,005

[22] Filed: Sep. 23, 1994

Related U.S. Application Data

[63] Continuation of Ser. No. 55,197, Apr. 28, 1993, abandoned.

[30] Foreign Application Priority Data

May 5, 1992 [GB] United Kingdom ................... 9209646

[51] Int. Cl.$^6$ ............................... G06K 9/36; G06K 9/46
[52] U.S. Cl. ........................ 382/232; 382/233; 382/245; 345/202
[58] Field of Search .......................... 382/56, 232, 233, 382/236, 245, 253; 348/384, 415, 416, 391, 393, 394, 417, 418; 345/202

[56] References Cited

U.S. PATENT DOCUMENTS

| | | | |
|---|---|---|---|
| 4,707,738 | 11/1987 | Ferre et al. | 358/135 |
| 4,847,677 | 7/1989 | Music et al. | 382/56 |
| 5,210,605 | 5/1993 | Zaccarin et al. | 358/105 |

FOREIGN PATENT DOCUMENTS

| | | |
|---|---|---|
| 0174056 | 4/1985 | European Pat. Off. |
| 2188509 | 2/1987 | United Kingdom. |
| WO87/04034 | 7/1987 | WIPO. |

Primary Examiner—Leo Boudreau
Assistant Examiner—Phuoc Tran
Attorney, Agent, or Firm—Woodcock Washburn Kurtz Mackiewicz & Norris

[57] ABSTRACT

The decompression side of the system has apparatus for forming a sequence of arrays of pixel display values for driving a display device from a stream of compressed data containing compressed data codes. Each of the arrays of pixel display values represents a frame of a moving image. Pixel copy codes within the stream of compressed data trigger copying of one or more previously formed pixel display values to a current position within a sequence of positions within the array along which decompression progresses. New pixel codes within the stream of compressed data trigger mapping of one or more pixel appearance values specified by the new pixel codes to respective pixel display values. The pixel display values derived from the new pixel codes are then written to a current position within the sequence. The compression side provides a complementary mechanism for generating such pixel copy codes and new pixel codes from source image data.

14 Claims, 10 Drawing Sheets

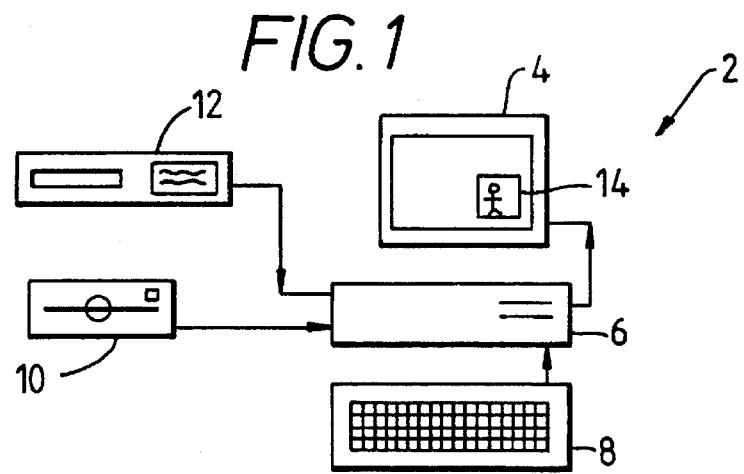
FIG.1
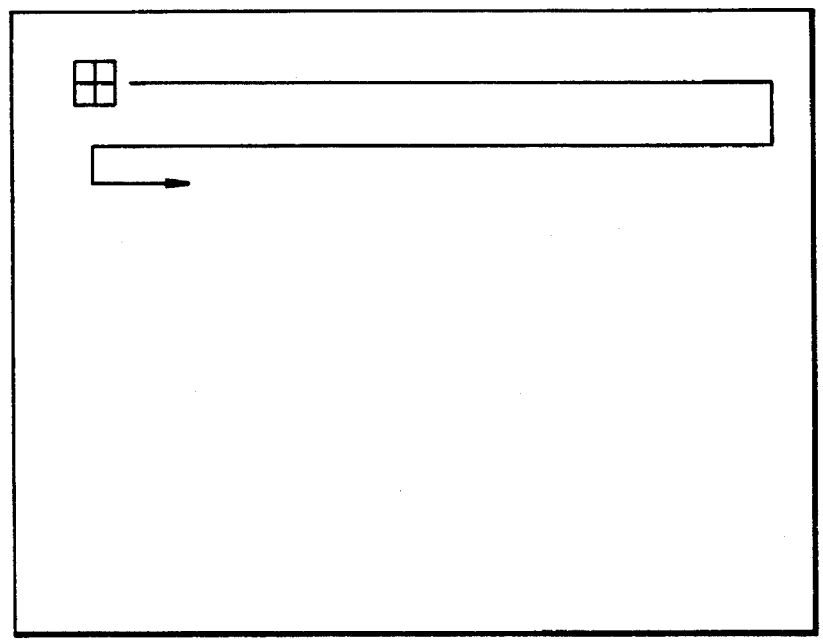
FIG.2
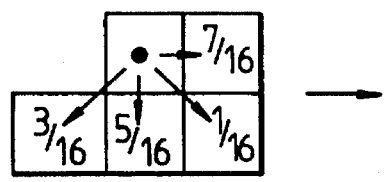

PREVIOUS FRAME

CURRENT FRAME

| START POSITION | PIXEL VALUES |
|---|---|
| C | a, b, c, d, e, f, ⋯ |
| ST | n, o, p, q, r, ⋯ X |
| ST' | a, b, c, d, v, ⋯ √ (4) |
| SS | a, b, c, d, e, w, ⋯ √ (5) |

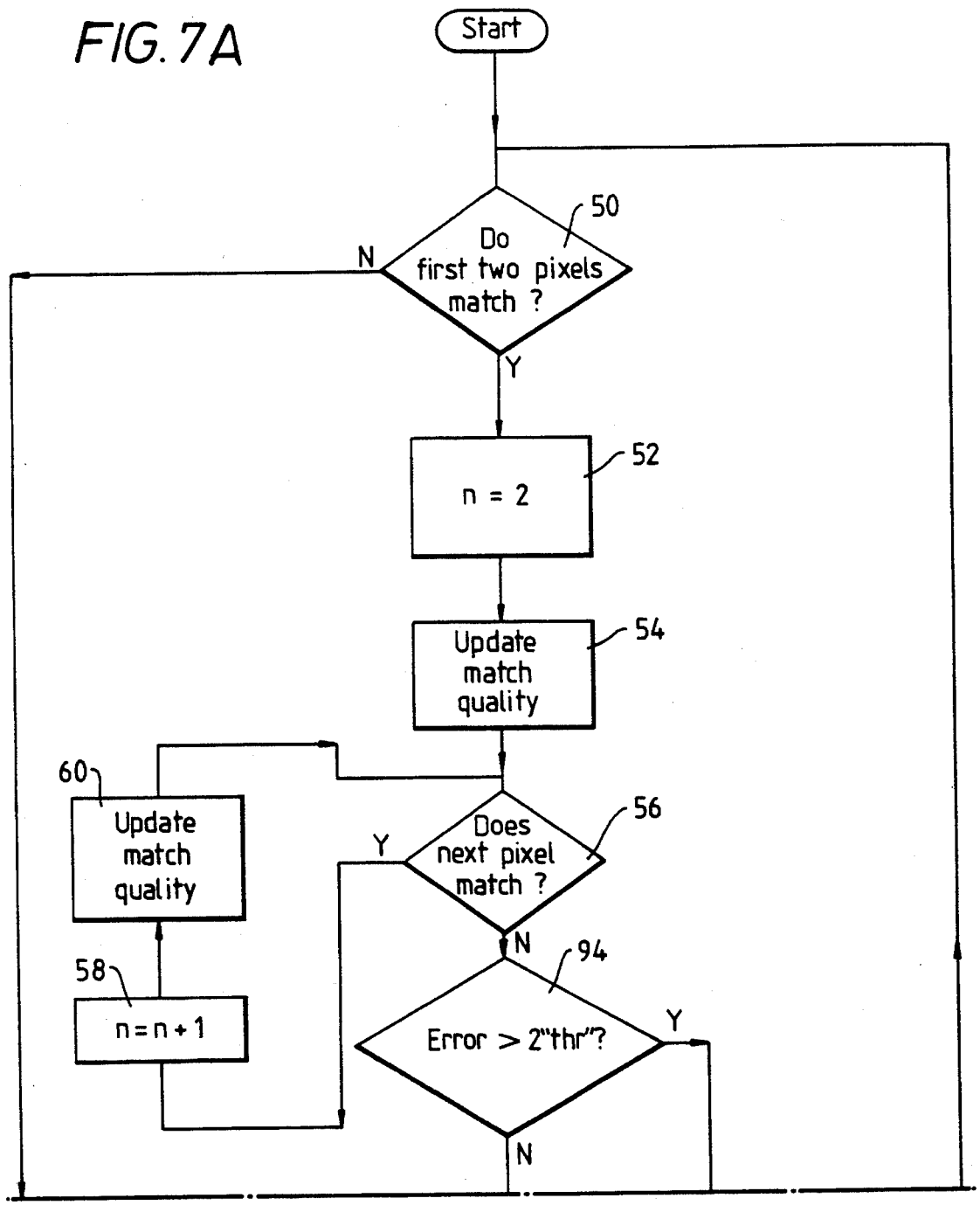

PREVIOUS FRAME

CURRENT FRAME

PREVIOUS FRAME

CURRENT FRAME

IMAGE DATA COMPRESSION

This is a continuation of application Ser. No. 08/055,197, filed Apr. 28, 1993 now abandoned.

BACKGROUND OF THE INVENTION

1. Field of the Invention

This invention relates to the field of image data compression.

2. Description of the Prior Art

It is known to provide hardware systems which allow the replay of video pictures from a digital media upon the display of a computer system, e.g. the Intel/IBM DVI on ActionMedia II computer systems and embodiments of the proposed Moving Picture Experts Group (MPEG) standard. Such approaches use complete special purpose systems, starting at a CD-ROM drive and having their own processing power and frame store which is then overlaid upon a normal computer picture. These systems are expensive and require an advance computing platform to run them. Other known similar hardware systems, such as Philips CD-I machines, are completely separate units not integrated into a computer system.

A number of software based systems which are able to display moving images are also available, e.g. Apple Quick-Time and EIDOS EditOne. Whilst these software based systems can be readily integrated with the operation of the rest of a computer system, they require powerful, and consequently expensive, computers to run them and either cannot manage to play at a uniform frame rate or have a poor picture resolution.

It will be appreciated that the provision of moving video images in a computer system is a difficult task. Moving video images are highly information dense with the result that, even when using large capacity storage media such as CD-ROMs, data compression is required so that a satisfactory playing time can be achieved. In addition to these storage requirement problems, the decompression of the data and its painting on the computer display require a large portion of the processing capacity of even a powerful computer.

A typical approach is that the video image data is digitised as a sequence of pixel appearance values (e.g. component RGB values) and then compressed using a lossy compression algorithm to achieve a desired data size per frame. Upon replay, the compressed data is read from the storage medium and decompressed back into a frame of pixel appearance values that are mapped to display pixel values of a type matched to and capable of driving the particular display device being used.

The rate at which data can be read from a CD-ROM is limited to about 150,000 bytes per second which allows about 6000 bytes for each frame at a frame rate of 25 frames per second. This is reduced to about 500 bytes per frame when provision is made recording sound to accompany the moving images and to allow for access latency in the storage device. Compressing an image of an acceptable quality to 5000 bytes per frame requires the use of sophisticated compression and decompression algorithms which in turn place high demands upon the processing capacity of the computer system. Furthermore, in order to provide the flexibility to allow the recorded video images to be replayed using more than one type of video display device, it is necessary to support the overhead of mapping pixel appearance values to pixel display values needed to drive the display device concerned.

SUMMARY OF THE INVENTION

This invention is concerned with the problem of producing video images from a compressed data stream with reduced processing requirements.

This invention provides apparatus for forming a sequence of arrays of pixel display values for driving a display device from a stream of compressed data containing compressed data codes each of said arrays of pixel display values representing a frame of a moving image, said pixel display values being decoded in a predetermined sequence of positions within each array of pixel values, each compressed data code representing one or more pixel values extending from a current position reached with said predetermined sequence positions, said apparatus comprising:

(i) means responsive to a pixel copy code within said stream of compressed data for copying one or more previously formed pixel display values to the current position within said array;

(ii) means responsive to a new pixel code within said stream of compressed data for mapping one or more pixel appearance values specified by said new pixel code to respective pixel display values; and (iii) means for writing said pixel display values derived from said new pixel code to the current position within said array.

Embodiments of the invention provide a system with reduced data processing requirements. The invention both recognises and exploits that by providing pixel copy codes that per se contain no appearance information, no mapping from pixel appearance values to pixel display values need be performed for that code. Mapping pixel appearance values to pixel display values need be performed only when a new pixel is introduced into the image for the first time by a new pixel code, since subsequently the already mapped pixel display value will be copied from position to position as appropriate.

Since image data is generally highly temporally and spatially correlated, pixel copy codes can be frequently used as parts of a representation of a new frame of image data with the advantages of both providing effective compression and a reduction in the amount of processing that need by performed upon decompression. In one trial the mapping of only new pixel codes in accordance with the invention produced a reduction of 30% in the processing time needed to decompress and paint a frame compared to conventional approaches whereby the full image was first decompressed and then subsequently mapped as a whole. Such improvements in decompression speed are highly advantageous since it is critical when replaying a sequence moving images that real time operation be achieved. It must also be borne in mind that after having decompressed the images, the computer should have sufficient processing capacity remaining to handle the reproduction of sound to accompany the moving images so as to provide the desired effect.

The mapping of pixel appearance values to pixel display values could take many forms. A particularly common form of mapping that is required in computer systems in order to produce an image with a sufficiently broad range of colours and intensities given the limitations of typical computer display systems is to map the pixel appearance values into dithered pixel values whereby each pixel appearance value is represented by a small group of display pixels whose colours and intensities are carefully chosen and slightly different from one another so as to produce an overall effect of a desired colour and shade. Mapping to dithered pixel values to represent a full colour image can be a particularly processing intensive operation to which the invention can make a valuable contribution to reducing processing requirements. In such situations the pixel appearance values are typically colour component values.

In order to exploit temporal correlation between the images in adjacent frames, preferred embodiments of the invention are such that in response to a pixel copy code that is a temporal copy code, said previously formed pixel display values are copied from a preceding frame.

Temporal correlation may be present between widely spaced parts of adjacent image frames, but in most sequences of image frames most temporal correlation occurs between regions that are closely spaced in the adjacent image frames. In preferred embodiments of the invention said temporal copy code specifies a position within a temporal source window centred on a position within said preceding frame corresponding to said current position from which said previously formed pixel display values are to be copied. This feature allows an increase in the degree of compression achievable since only a relative position need be specified and also reduces the time taken to compress each image frame since temporal correlation is only looked for within the temporal source window.

In an analogous manner, spatial correlation can be exploited by preferred embodiments of the invention in which wherein, in response to a pixel copy code that is a spatial copy code, said previously formed pixel display values are copied from that frame currently being formed.

Once again, the degree of compression achievable and compression times can be improved in embodiments in which said spatial copy code specifies a position within a spatial source window adjacent said current position from which said previously formed pixel display values are to be copied.

Pixel copy codes may be provided based upon various different shapes and sizes of previously formed pixel display values, e.g. rectangles or triangles of previously formed pixels. However, in preferred embodiments of the invention said previously formed pixel display values are copied from consecutive memory locations and form a linear string of pixel values. This feature exploits the fact that many computer processors have efficient and fast machine code instructions for copying data values from consecutive addresses and that with directly mapped display memories the image data is required to be painted in consecutive memory locations.

The invention also provides a method of forming a sequence of arrays of pixel display values for driving a display device from a stream of compressed data containing compressed data codes each of said arrays of pixel display values representing a frame of a moving image, said pixel display values being decoded in a predetermined sequence of positions within each array of pixel values, each compressed data code representing one or more pixel values extending from a current position reached with said predetermined sequence positions, said method comprising the steps of:

(i) in response to a pixel copy code within said stream of compressed data, copying one or more previously formed pixel display values to the current position within said array;

(ii) in response to a new pixel code within said stream of compressed data, mapping one or more pixel appearance value specified by said new pixel code to respective pixel display values; and (iii) writing said pixel display values derived from said new pixel code to the current position within said array.

A complementary aspect of this invention is a system of compression which produces a stream of compressed data of a form in which mapping of pixel appearance value to pixel display values need only be performed for pixels upon their first occurrence within the image. Accordingly, the invention also provides apparatus for forming a stream of compressed data containing compressed data codes from a sequence of arrays of pixel values, each of said arrays of pixel values representing a frame of a moving image, said pixel display values being encoded in a predetermined sequence of positions within each array of pixel values, each compressed data code representing one or more pixel values extending from a current position within said predetermined sequence of positions, said apparatus comprising:

(i) means for searching through previously compressed pixel values from a preceding frame to identify one or more preceding frame pixel values matching one or more pixel values at a current position within an array of pixel values being compressed and in response to such identification generating a temporal copy code for controlling copying of said preceding frame pixel values to said current position upon subsequent decompression;

(ii) means for searching through previously compressed pixel values from that frame currently being compressed to identify one or more current frame pixel values matching one or more pixel values at a current position within an array of pixel values being compressed and in response to such identification generating a spatial copy code for controlling copying of said current frame pixel values to said current position upon subsequent decompression; and (iii) means for generating a new pixel code representing any non-matching pixel to be compressed that cannot be represented by a temporal copy code and cannot be represented by a spatial copy code, said new pixel code specifying pixel appearance.

The advantages discussed above in relation to temporal copy codes, spatial copy codes, temporal source windows and spatial source windows also apply to this aspect of the invention.

This complementary aspect of the invention also provides a method of forming a stream of compressed data containing compressed data codes from a sequence of arrays of pixel values, each of said arrays of pixel values representing a frame of a moving image, said pixel display values being encoded in a predetermined sequence of positions within each array of pixel values, each compressed data code representing one or more pixel values extending from a current position within said predetermined sequence of positions, said method comprising the steps of:

(i) searching through previously compressed pixel values from a preceding frame to identify one or mope preceding frame pixel values matching one or more pixel values at a current position within an array of pixel values being compressed and in response to such identification generating a temporal copy code for controlling copying of said preceding frame pixel values to said current position upon subsequent decompression;

(ii) searching through previously compressed pixel values from that frame currently being compressed to identify one or more current frame pixel values matching one or more pixel values at a current position within an array of pixel values being compressed and in response to such identification generating a spatial copy code for controlling copying of said current frame pixel values to said current position upon subsequent decompression; and (iii) generating a new pixel code representing any non-matching pixel to be compressed that cannot be represented by a temporal copy code or a spatial copy code, said new pixel code specifying pixel appearance.

The above, and other objects, features and advantages of this invention will be apparent from the following detailed description of illustrative embodiments which is to be read in conjunction with the accompanying drawings.

BRIEF DESCRIPTION OF THE DRAWINGS

FIG. 1 schematically illustrates a computer system of the type in which the invention may be embodied;

FIG. 2 illustrates a reduction in size operation performed on a full frame pixel image;

FIG. 7A–7B is a flow diagram schematically illustrating the operation of the searches for correlated pixels;

DESCRIPTION OF THE PREFERRED EMBODIMENTS

Figure 3:
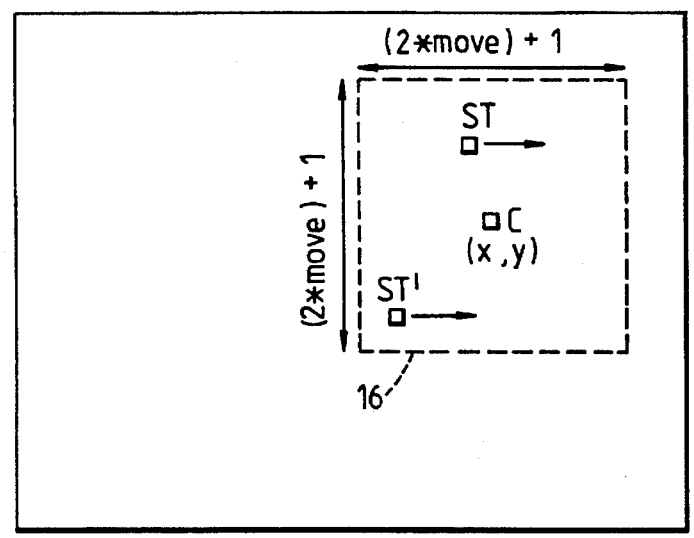
FIGS. 3 and 3A schematically illustrate the operation of the compression technique.

FIG. 1 shows a computer system 2 of the type in which the present invention may be embodied. The computer system 2 comprises a display 4, a system unit 6 and a keyboard 8 connected to a CD-ROM unit 10 and a video tape recorder 12 (the video tape recorder 12, or another video image source such as a laser disc unit, is not required on machines which are intended only for replay). The computer system 2 may be a Acorn Archimedes computer using an ARM2 or ARM3 microprocessor. The CD-ROM 10 is used as a high capacity storage device to store compressed moving image data for supply to the system unit 6 where it is decompressed and displayed upon the display 4. The video cassette recorder 12 is used as a source of frames of moving image data that is to be compressed into a stream of compressed data that may then be used to master CD-ROM discs. The display 4 shows an inset video window 14 displaying a full motion video picture of the type that can be generated from the stream of compressed data. The provision of such an inset window 14 contributes to providing the advantages associated with multimedia computing.

FIG. 2 illustrates a size reduction of a full frame of pixel data that is performed as the first step during compression of source image data. A frame of video image data from the video tape recorder 12 is digitised to a full screen size of 768 by 576 pixels at 24 bits per pixel. This uses 1327104 bytes per frame. The first step to meeting the required compression is to reduce the size of this full screen to 160 by 128 pixels using 15 bits per pixel (5 bits of each of red, green and blue). All source pixels (or fractions thereof) lying on an output pixel are summed at high resolution and the result scaled to 15 bits per pixel and dithered to avoid quantisation of colours. The summing process also effectively removes noise from the original and preserves small features as intermediate, anti-aliased values. The anti-aliasing is achieved by spreading the remainder bits from the scaling step among adjacent output pixels yet to be calculated according to the proportions illustrated in FIG. 2.

The reduction in size of the image is calculated on an output pixel by output pixel basis following a zig-zag pattern within the frame as illustrated in FIG. 2. The process reduces the data to 38400 bytes per frame.

The choice of 15 bits per pixel is a subtle one: it gives much better pictures than 8 bits per pixel, allowing the system to offer better pictures as computers deliver greater colour resolution, but it is also a small enough number for algorithms employing look up tables to be used. In practice, tables are used both for compression and decompression.

These intermediate frames are sufficiently small (1 MByte of data per second) to be stored on disc or animated if required. Such animation would require the use of a more powerful computer than is otherwise required for the rest of the operation.

The compression then has to further compress the data from the 38400 byte form by a factor around 7 in order to reach the CD-ROM data bandwidth target, no known lossless compression scheme is capable of this factor of compression and accordingly a lossy compression scheme is used. Since video images possess frame to frame correlation, and from a practical point of view the format need only provide forward play, the compression system uses a conditional replenishment scheme. This conditional replenishment scheme is capable of dealing with pans and zooms; effectively becoming a motion detection and coding scheme. Since the ARM processor can load and store consecutive memory locations to and from registers in one efficient instruction, this instruction is exploited to make the decompressor as fast as possible by searching for correlated horizontal lines of pixel values which will have consecutive memory addresses.

Potentially looking for horizontal lines of matching pixels is a very time consuming task. For each pixel of the frame to be compressed, a search of all pixels in the preceding frame to find, if possible, where it came from would be made. To provide some compression of newly introduced pixels in the current frame being compressed a further search of all pixels of the current frame would also be made to find matching pixels.

Figure 3A:
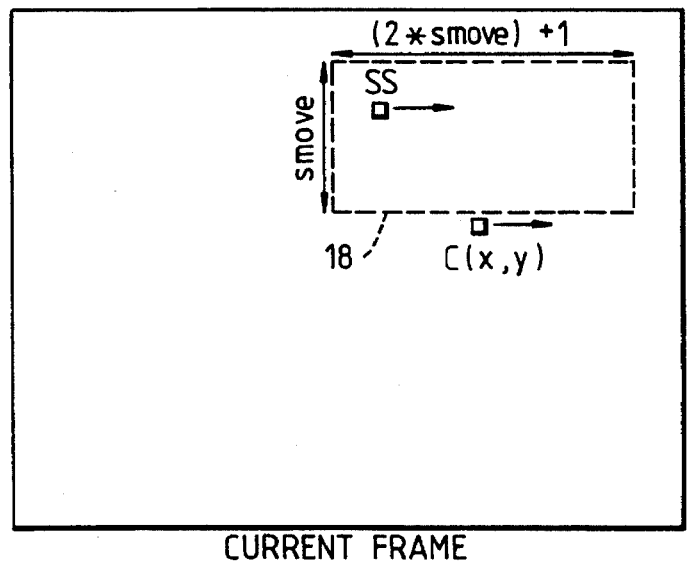

Restricting the area of search reduces the compression times. As illustrated in FIGS. 3 and 3A, for a pixel at point C (x, y) the compressor searches a temporal source window 16 from (x-move, y-move) to (x+move y+move) in the previous frame. If a matching pixel to that at point C (x, y) is found then the next pixel at position (x+1, y) is compared with the adjacent pixel in the preceding frame to that already found to match so as to identify a string of matching pixels.

It will be appreciated that this searching is highly processing intensive and so the value of "move" needs to be chosen such that the compressor will find most of the matching pixels it needs inside the area (i.e. large), but doesn't take too long to perform the search (i.e. small). For a talking head filmed with a stationary camera, "move" can be quite small—as low as 1—and still have the compressor find the pixels. However, for more general movement of subjects and a moving camera, "move" has to be larger. After trials on video images, with large moving subjects and with a pan and zoom camera viewpoint, the value of "move"=8 was found to give good results. Consequently, 289 original pixel positions in the preceding frame are searched for each pixel in the current frame that is a candidate string start point.

The compressor also searches the current video frame (up to the current scan line) for matching strings of pixels. This search is restricted to a spatial source window 18 extending from (x-smove y-smove) to (x+smove, y-1). A value of (smove=9) was adopted meaning a search of a further 171 pixel positions is conducted following the search in the previous frame.

Figures 4, 5:
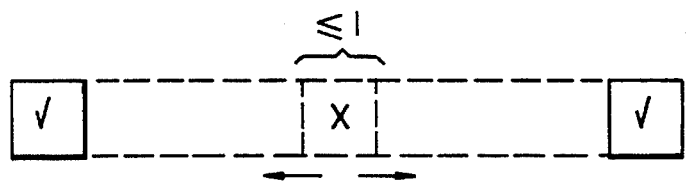
FIG. 4 illustrates example strings of pixels examined during the operation illustrated in FIGS. 3 and 3A.
FIG. 5 illustrates one of the requirements for a pixel string to be held to match.

FIG. 4 illustrates the strings of pixel values starting at and following on from a selection of points within the frames illustrated in FIG. 3 and 3A. The pixel string starting at C is the string for which it is desired to find a matching previously occurring string fox use as a source in a pixel copy code. The vast majority of positions at which searches are started will be uncorrelated as illustrated by start position ST and the search will terminate after one or two pixels. However, at some start positions such as ST' and SS a matching string of pixel values of some length will be found. Having fully searched both the temporal source window 16 and the spatial source window 18, the longest matching string of previously compressed pixels will be identified and this used as the basis of a command which will instruct a decompressor to copy those pixels to the current position C (x-y) upon subsequent decompression.

In the example illustrated in FIG. 4, the point SS in the spatial source window yields the longest matching string of five pixel values. Accordingly, a pixel copy code specifying a string length of five to be copied from relative position SS will be generated. The next pixel that need be considered for compression in the current frame will be at (x+5, y).

It will be appreciated that for non-synthetic video compression it isn't sufficient just to test for equality between pixels. There is bound to be noise in the original picture added to quantisation noise when the images were digitised and dithering noise introduced when the images were changed in size to 160 by 128 pixels. Instead, a measure of the distance apart of the pixels color values (in notional 3D color space) is tested to see if it is less than a threshold value ("thr"). The compressor computes the squared distance $((r1-r2)^2+ (g1-g2)^2+ (b1-b2)^2)$ and tests if this is less than or equal to "thr". If "thr" is 0, then this is an expensive way of testing for equality. The higher the value of "thr", the longer the horizontal line segments will be likely to be and the better the compression ratio. Too high a value of "thr" results in the compressor piecing together a scene of lines which are visibly the wrong colors. A single value of the threshold is not used, since it represents a very large percentage change for dark colors and a small percentage change for bright colors. The compressor has a table of threshold values indexed by the pixels in the original sample: 32768 bytes of different values.

FIG. 5 illustrates an additional level of sophistication that may be incorporated in the matching process. It is inevitable that in non-synthetic image data there will be some noise such as pixel dropouts. Erroneous pixel values produced by such noise may result in pixel strings being deemed not to match when in fact they do. Accordingly, the matching test allows for one badly matching pixel (mismatch less than or equal to 2*"thr") within a string of pixels with good pixel values at each end of the pixel string.

If, following all of the above described searching, the compressor has not been able to identify a matching string of pixels of at least two pixels in length, then it generates a new pixel code specifying the pixel appearance value (RGB value) of the non-matching pixel.

The compressor's output has to be packed into a form which is small and quick to decompress. All packets are made one uniform size: 16 bits. This decision lost around 1/15 (7%) of the coding density of a variable length scheme, but was nearly twice as fast for decompression. The possible meanings of a word are:

new pixel: coded as <15 bits>0

This is a "new" pixel—a single pixel which the compressor could not find in the previously compressed pixels.

temporal: coded as <direction><length>1

The position of the source relative to the target is encoded as a 9 bit number. 0 represents (x-move, y-move), 1 (x-move+1,y-move) etc. up to (x,y) which is not coded in this form. Then (x+1,y) is the next number. Thus, the 289 positions for "move"=8 are coded as the values 0–287, omitting the "no movement case" which is covered by a different code. The remaining 6 bits of information expresses the length of the horizontal line: 0–63 code for lengths of 2 to 65 pixels.

spatial: coded as <direction><length>1

The position of the source relative to the target is encoded as a 9 bit number. 288 represents (x-smove, y-smove), 289 (x-smove+1, y-smove) etc. up to 459 for (x+smove, y-1). The remaining 6 bits of information expresses the length of the horizontal line: 0–63 code for lengths of 2 to 65 pixels.

skip n pixels: coded as <11110><length>1

A five bit header <11110> which cannot be a temporal or spatial moving line packet (too big to be the first five bits of any valid <direction> value) signals a skip n pixels packet. 10 bits of information code for skips of length 1 to 1024. This is a "special" case and could have been coded as a member of the temporal or spatial groups; however coding it in this way allows a greater <length> field to be used for the frequently occurring "no movement case"

new n pixels: coded as <11111><length>1

A five bit header <11111> which cannot be a temporal or spatial moving line packet signals a new n pixels packet. 10 bits of information code for values 16 to 1024. This packet is then followed by n 15 bit pixels values. (For values of n less than 16 the compressor uses the new pixel packet form since it is denser and very nearly as fast). After unpacking the 15 bit pixels, the decompressor gets back to the fast 16 bit alignment.

end of frame: coded as <111001100><0>1

This code is not strictly necessary since the decompressor could observe when it had reached the end of the frame by testing the number of pixels it had decompressed. However doing this test on every code word is slower than having a special code word signalling the end of the frame.

The 16 bit stream continues for N frames before being broken and the whole "chunk" of compressed information being stored to disc. N is selectable at compression time (e.g. 50 for 25 frames per second (fps) and 25 for 12.5 fps to give 2 second in a chunk) and is a tradeoff between the size of memory buffers needed for a chunk versus the efficiency of fewer disc i/o operations while decompressing (the compressed chunks are double buffered from disc).

Figure 6:
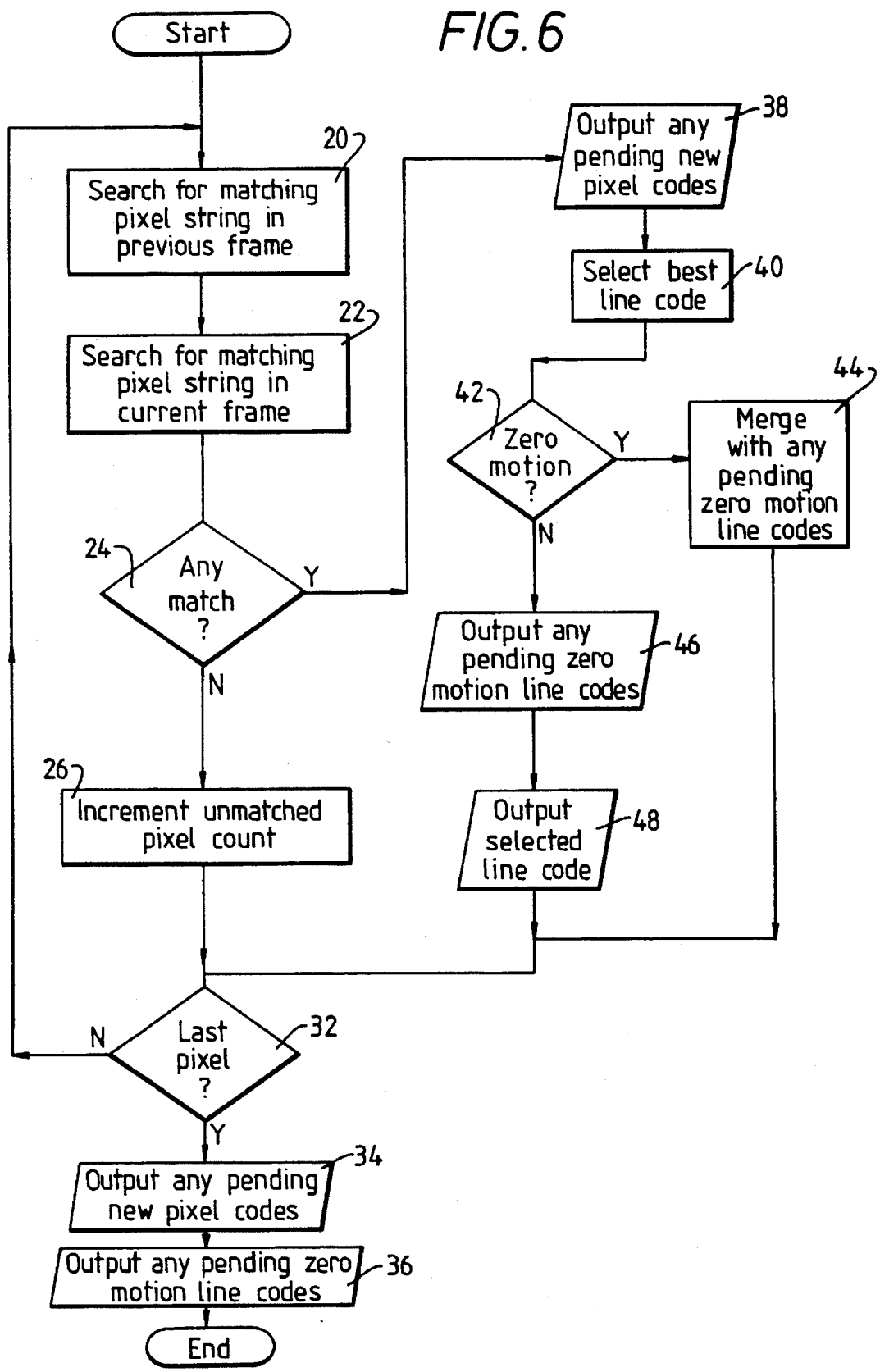
FIG. 6 is a flow diagram schematically illustrating the overall operation of the compression technique.

FIG. 6 schematically illustrates, in flow diagram form, the operation of the compressor. At steps 20 and 22 the above-described searches for matching pixels within the temporal source window 16 and the spatial source window 18 are made. At step 24 if no matching string of pixels of minimum length two pixels was found, then the process proceeds to step 26 where a count of unmatched pixels is incremented. At step 32 a test is made to determine if the last pixel within the frame to be compressed has been reached. If the last pixel has not been reached, then the process returns to step 20. If the last pixel has been reached, then any pending codes are output at steps 34 and 36. In the case of new pixel codes, these can be either "new pixel" codes or "new n pixel" codes. The choice as to which code type is used is made based upon the number of pixels to be encoded. If this number is more than 16, then the "new n pixel" codes are more efficient. If the count is found to be greater than 1024, then more than one "new n pixel" code is generated, since 1024 is the maximum length of new pixels that can be represented by such a code.

Returning to step 24, if a matching string of pixels was found, then the first task is to issue any pending new pixel codes. Step 38 outputs the most appropriate code as described above. Step 40 selects the longest matching string of pixels that was found during steps 20 and 22.

If the longest string of matching pixels was found at a zero motion position, then step 42 passes control to step 44 where this matched string is merged with any previously detected pending zero motion line codes (i.e. "skip n pixel" codes) before control is passed to step 32. Since zero motion is common within real data it is worthwhile supporting this overhead of merging pending zero motion codes in the interests of improved coding efficiency and speed of decompression.

If at step 42, the best matching string of pixels was not a zero motion case, then control passes to steps 46 and 48 at which any pending zero motion codes are output followed by the best line code selected at step 40. Control then passes to step 32.

Figure 7B:
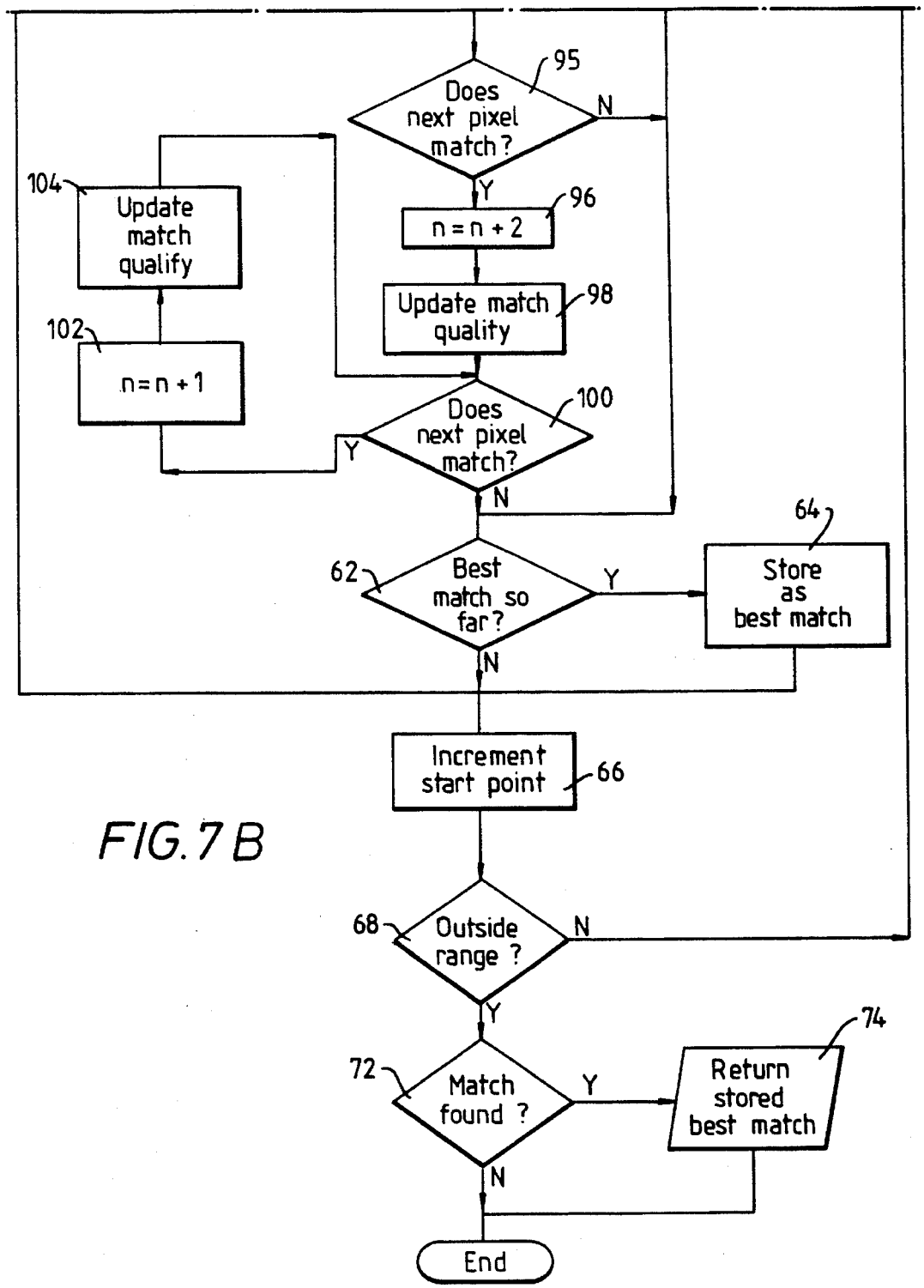

FIG. 7A–7B is a flow diagram schematically illustrating the operation of the searches for matching pixel strings that are performed during steps 20 and 22 of FIG. 6. At step 50 a test is made to see if a minimum of two pixels match. If this condition is met, then at step 52 a matching pixel string length value "n" is set equal to two. At step 54 a match quality value for the string found is updated.

The match quality value gives an indication of how closely the string matches the string to be compressed given that it already passes the threshold test previously described. The match quality values can be considered as a counter whose value is incremented if a particular pixel within a string closely matches and decremented if it does not closely match. At the end of the search a match quality value for the string identified can be used to discriminate as to which string to use in the compressed data stream should two strings have the same pixel length.

At step 56 a test is made as to whether the next pixel matches. If the next pixel does match, then at steps 58 and 60 the value of "n" is incremented and the match quality value updated to reflect the new pixel added to the matching pixel string.

When at step 56 the next pixel does not pass the threshold test, a test is made to see how badly the pixel matches. If the mismatch is too great to be tolerated (i.e. > 2*"thr"), then the matching string is immediately terminated and the process passes to step 62. If the mismatch was not too bad and the next pixel is within the threshold limit (step 95), then n is increased by two and the process enters another matching pixel loop about steps 100, 102 and 104. The above allows one badly matching pixel in the middle of a string to be tolerated as discussed in relation to FIG. 5.

When the matching pixel string is found to be terminated, the process proceeds to step 62 where the matching string currently under consideration is compared with any previously detected matching string of pixels and the pixel string which is the best match is chosen via step 64 if appropriate.

At step 66 the start point within the source window is incremented. If at step 68 the incremented start point is not outside of the source window, then the process returns to step 50. If at step 68 the incremented start point is outside of the source window, then steps 70 and 72 operate to return to the main process the best match pixel string found.

Figure 8:
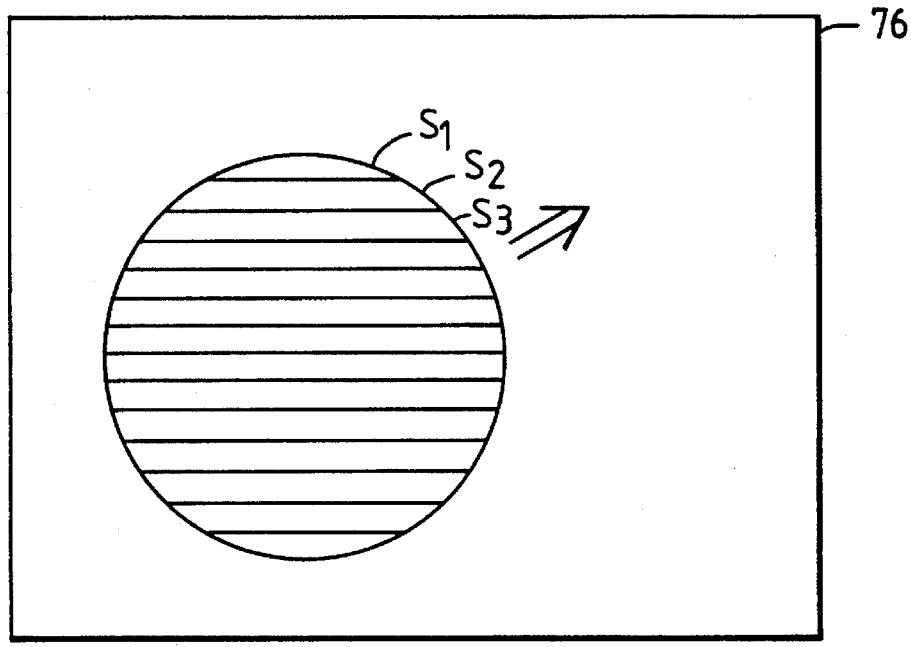
FIGS. 8 and 8A illustrates two adjacent image frames with differing types of image correlation.
Figure 8A:
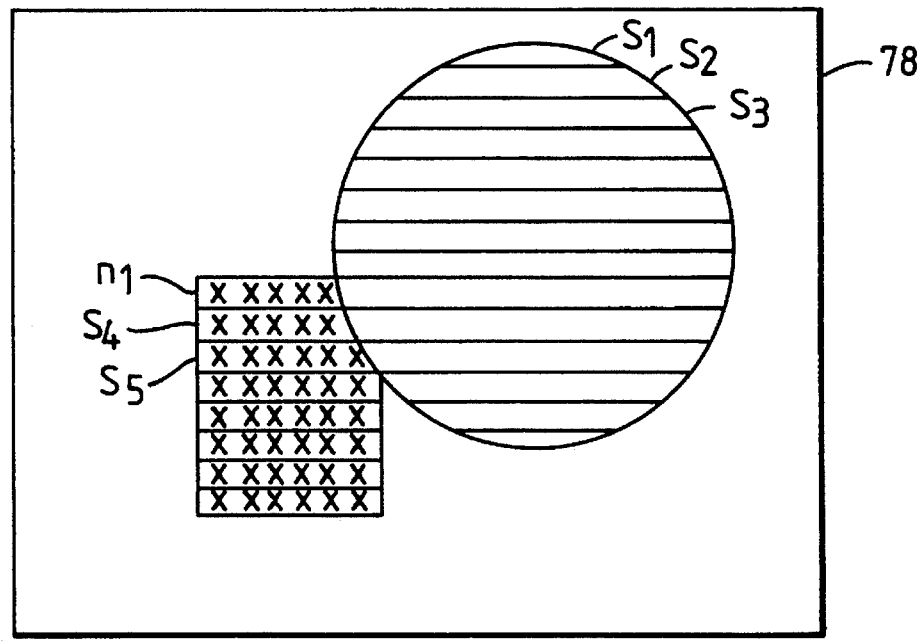

FIGS. 8 and 8A illustrate two respective image frames. Frame 76 includes a circle that is moving rightwards and upwards. In the following frame 78 the movement of this circle has revealed an underlying rectangle of a spatial correlated appearance, e.g. a uniform color.

The operation of the compressor seeks to match the strings of pixels forming the circle in frame 78 to the corresponding strings of pixels forming the circle in frame 78. These strings of pixels are illustrated as $s_1$, $s_2$ and $s_3$. When the compressor has identified these strings it will issue appropriate temporal pixel copy commands. Since the circle is present in both frames it is highly likely that the longest matching pixels strings will be found during the search through the temporal source window.

In contrast to the temporal correlation exhibited by the circle, the rectangle is of a uniform color and accordingly exhibits a spatial correlation within the frame 78. Upon compressing the frame 78, the first pixels to be encountered of the rectangle will be the string of pixels $n_1$ and these will be encoded using new pixel codes. Subsequent to this, the search through the spatial source window will reveal matching previously compressed pixels at least the positions corresponding to $n_1$ and accordingly spatial copy codes will be issued.

Figure 9:
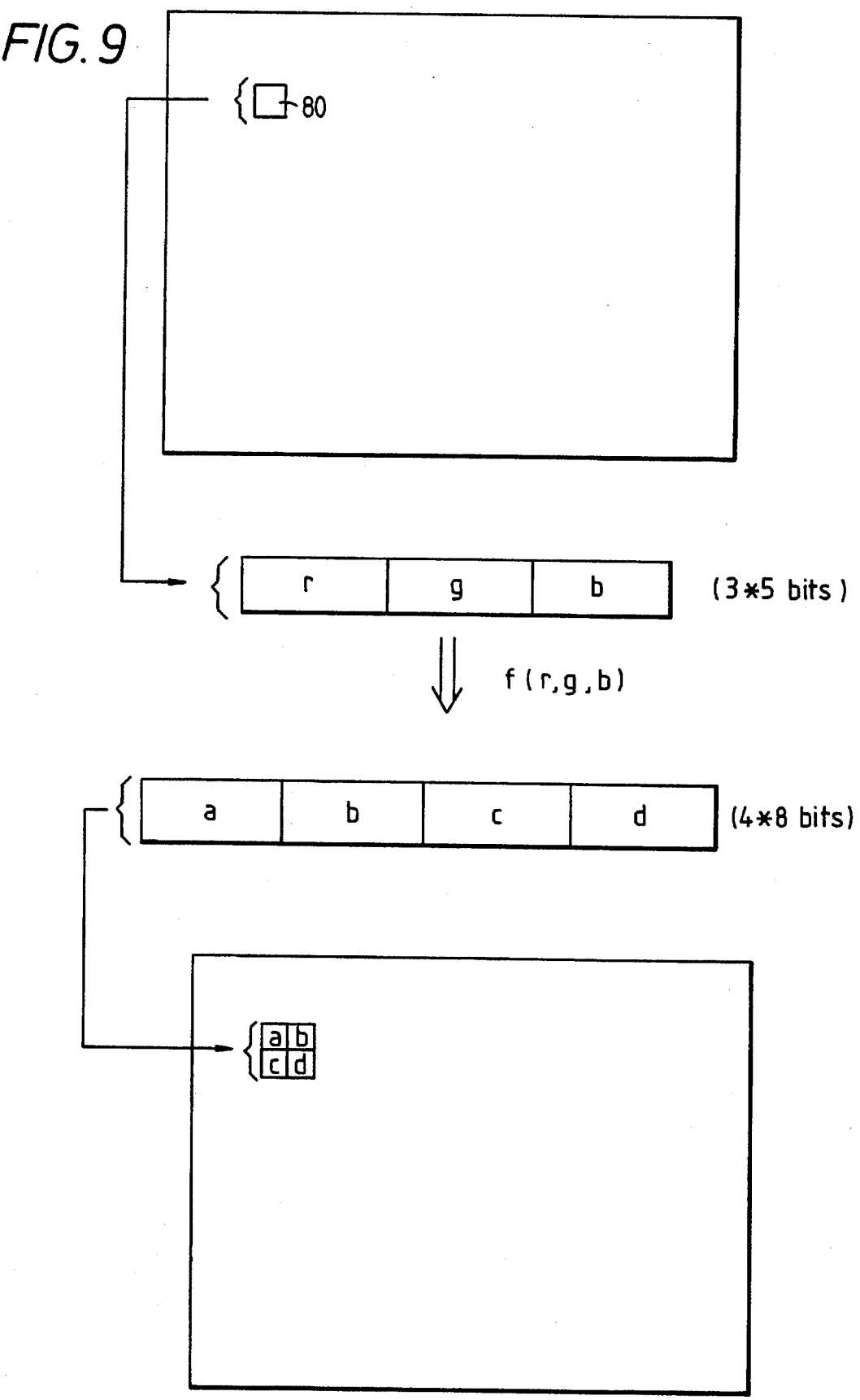
FIG. 9 illustrates the mapping of an RGB pixel appearance value to a dithered pixel display value.

FIG. 9 illustrates a mapping of pixel appearance values to pixel display values. When a new pixel 80 that has not previously been mapped is encountered during decompression (i.e. a new pixel code is received), this specifies a 15 bit appearance value. Depending upon the screen mode being used to display the data, there will be an appropriate mapping of this 15 bit appearance value to a dithered pixel value. In this case, the new pixel 80 is mapped to 4 pixels a, b, c, d each having an 8 bit word specifying their color. The 8 bit words are carefully chosen so as to combine to most closely approximate to the appearance specified in the 15 bit RGB value. This mapping is standard color dithering and, as previously mentioned, is performed using a look up table.

Figure 10:
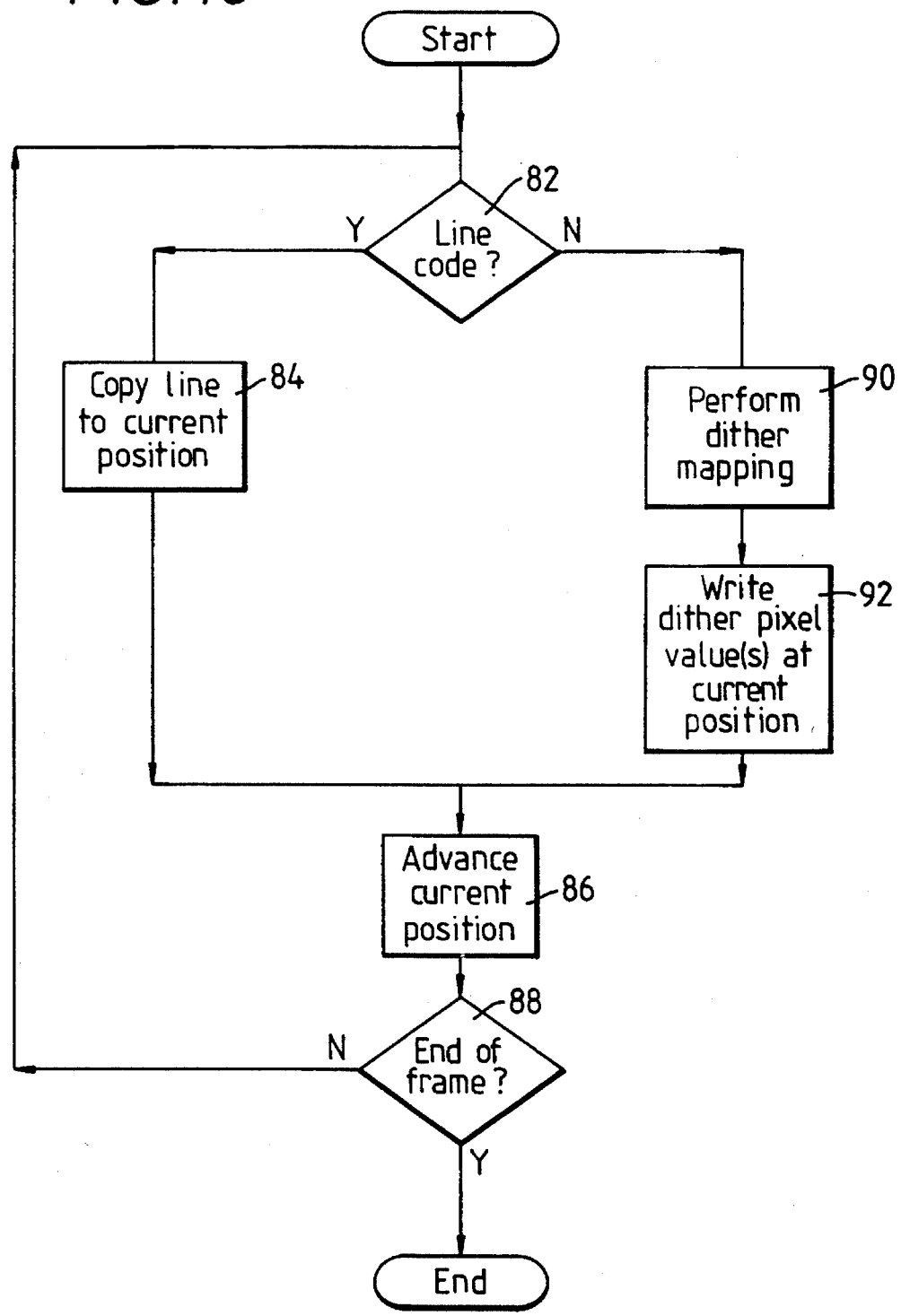
FIG. 10 is a flow diagram schematically illustrating a corresponding decompression technique.

FIG. 10 is a flow diagram schematically illustrating the operation of the decompression. At step 82 a test is made as to whether the code being received is a line code (pixel copy code). If the code received is a line code, then the process proceeds to step 84 and executes the specified pixel copy from previously decompressed pixels within either the current frame or the previously decompressed frame. At step 86 the position within the current frame being decompressed is advanced by the number of pixels represented by the code that has just been decompressed. At step 88 a test is made as to whether the end of the current frame has been reached and, if not, the process returns to step 82.

If at step 82, the code to be decompressed was not a line code then the code must be a new pixel code and then process proceeds to step 90 where the dither mapping illustrated in FIG. 9 is performed for that new pixel value. The dithered pixel values derived at step 90 are then written to the current position within the frame being decompressed at step 92 prior to control being passed to step 86.

It is of note that the decompression process is simpler than the compression process and accordingly should operate more rapidly. This is desirable since real time operation is required on decompression whereas non-real time operation can be tolerated during compression. If the video images being reproduced are highly correlated then the vast majority of pixels will be produced by pixel copy codes via step 84. Only those pixels that cannot be copied from anywhere else are represented by new pixel codes and must accordingly undergo dither mapping. Once a pixel has been dither mapped, it is the dithered value that is the value that will be copied upon a subsequent pixel copy code specifying that dithered pixel. Thus, dithering need only be performed once for each pixel.

Figure 11:
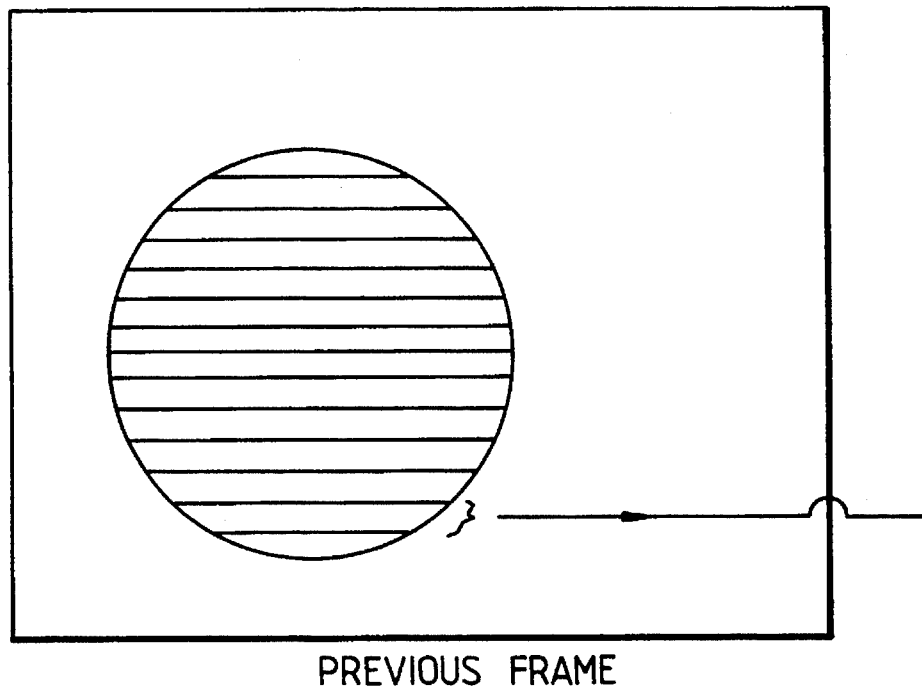
FIG. 11 illustrates the image frames of FIG. 8 during subsequent decompression.
Figure 11:
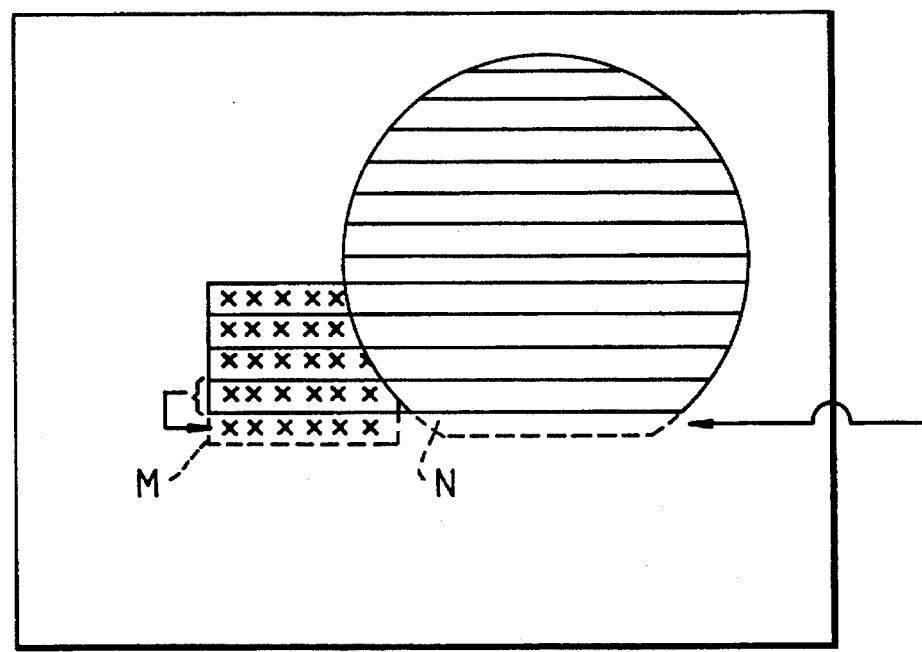

FIG. 11 illustrates the decompression of the image shown in FIGS. 8 and 8A. When the point M is reached in the current frame, a spatial copy code will be issued instructing the decompressor to copy the adjacent pixel string immediately above the pixel of point M so as to form the next line of the rectangle. This is possible since the rectangle is, in this example, of a sufficiently uniform color to show a high degree of spatial correlation. Other forms of spatial correlation are possible other than the simple example of uniform color.

When point N is reached, a temporal copy code instructs the decompressor to copy the corresponding pixel string from the previous frame to the position starting at point N within the current frame. Since this is a temporal correlation, the circle need not be of uniform appearance providing that matching strings can be found in adjacent frames.

The overall operation of the compressor is such that it is playable only forwards. Each frame is therefore allowed to contain references both to itself and to the previous frame. In order to allow the decompression to start at any position in a movie, a separate data structure contains the state of the stream at the start of each data block (which contains two seconds of video), but this data structure need not be considered when computing the compression and data bandwidth required to play the movie.

The video compressor is "size directed". It compresses the frame under consideration at the current quality threshold (match threshold, "thr") checks to see if the resultant size is correct for the media the movie will be decompressed from, and tries again at a different quality threshold if necessary. This capability of the compressor allows movies to take maximum benefit of the digital device for which they are mastered. When frames are sufficiently simple to compress, the quality level rises to a level where there is no discernable difference between the original 160 by 128 picture and the compressed version. When a cut occurs or frames are not easy to compress, the quality level falls, sometimes producing quite quantised images.

The consistent size of the compression version of a frame has a large benefit in that it always requires approximately the same amount of processing power to decompress it. This then makes it easier to achieve uniform display rates from the decompressing computer.

However, the continuous data stream does have a disadvantage in that a computer which is not capable of decompressing the data at the full rate cannot cope at all. In order to allow access by less powerful computers, the movie is compressed twice, once at full frame rate and once at half frame rate, and provided as two separate files.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined in the appended claims.

I claim:

1. Apparatus for forming a sequence of arrays of pixel display values for driving a display device from a stream of compressed data containing compressed data codes, each of said arrays of pixel display values representing a frame of a moving image, said pixel display values being decoded in a predetermined sequence of positions within each array of pixel values each compressed data code representing one or more pixel values extending from a current position reached within said predetermined sequence of positions, said apparatus comprising:

(i) means responsive to a pixel copy code within said stream of compressed data for copying each pixel value of a sequence of a plurality of previously formed pixel display values from respective positions extending from a position different from said current position to respective positions extending from said current position within said array, pixel display values being permitted to vary randomly within said sequence of a plurality of previously formed pixel display values;

(ii) means responsive to a new pixel code within said stream of compressed data for mapping one or more pixel appearance values specified by said new pixel code to respective pixel display values; and (iii) means for writing said pixel display values derived from said new pixel code to said current position within said array.

2. Apparatus as claimed in claim 1, wherein said pixel display values are dithered pixel values.

3. Apparatus as claimed in claim 1, wherein said pixel appearance values are component color values.

4. Apparatus as claimed in claim 1, wherein, in response to a pixel copy code that is a temporal copy code, said previously formed pixel display values are copied from a preceding frame.

5. Apparatus as claimed in claim 4, wherein said temporal copy code specifies a position within a temporal source window centred on a position within said preceding frame corresponding to said current position from which said previously formed pixel display values are to be copied.

6. Apparatus as claimed in claim 1, wherein, in response to a pixel copy code that is a spatial copy code, said previously formed pixel display values are copied from that frame currently being formed.

7. Apparatus as claimed in claim 6, wherein said spatial copy code specifies a position within a spatial source window from which said previously formed pixel display values are to be copied.

8. Apparatus as claimed in claim 1, wherein said previously formed pixel display values are copied from a sequence of consecutive memory locations within a memory storing said previous formed pixel display values and form a linear string of pixel values.

9. A method of forming a sequence of arrays of pixel display values for driving a display device from a stream of compressed data containing compressed data codes, each of said arrays of pixel display vales representing a frame of a moving image, said pixel display values being decoded in a predetermined sequence of positions within each array of pixel values each compressed data code representing one or more pixel values extending from a current position reached within said predetermined sequence of positions, said method comprising the steps of:

(i) in response to a pixel copy code within said stream of compressed data, copying each pixel value of a sequence of a plurality of previously formed pixel display values from respective positions extending from a position different from said current position to respective positions extending from said current position within said array, pixel display values being permitted to vary randomly within said sequence of a plurality of previously formed pixel display values;

(ii) in response to a new pixel code within said stream of compressed data, mapping one or more pixel appearance values specified by said new pixel code to respective pixel display values; and (iii) writing said pixel display values derived from said new pixel code to said current position within said array.

10. Apparatus for forming a stream of compressed data containing compressed data codes from a sequence of arrays of pixel values, each of said arrays of pixel values representing a frame of a moving image, said pixel display values being encoded in a predetermined sequence of positions within each array of pixel values, each compressed data code representing one or more pixel values extending from a current position within said predetermined sequence of positions, said apparatus comprising:

(i) means for searching through previously compressed pixel values from a preceding frame to identify one or more preceding frame pixel values matching one or more pixel values at a current position within an array of pixel values being compressed and in response to such identification generating a temporal copy code for controlling copying of said preceding frame pixel values to said current position upon subsequent decompression;

(ii) means for searching through previously compressed pixel values from that frame currently being compressed to identify one or more current frame pixel values matching one or more pixel values at a current position within an array of pixel values being compressed and in response to such identification generating a spatial copy code for controlling copying of said current frame pixel values to said current position upon subsequent decompression; and (iii) means for generating a new pixel code representing any non-matching pixel to be compressed that cannot be represented by a temporal copy code and cannot be represented by a spatial copy code, said new pixel code specifying pixel appearance.

11. Apparatus as claimed in claim 10, wherein said temporal copy code specifies a position within a temporal source window centred on a position within said preceding frame corresponding to said current position from which said previously formed pixel display values are to be copied upon decompression.

12. Apparatus as claimed in claim 10, wherein said spatial copy code specifies a position within a spatial source window from which said previously formed pixel display values are to be copied upon decompression.

13. Apparatus as claimed in claim 10, wherein said pixel values are held to match when differing by less than a threshold value.

14. A method of forming a stream of compressed data containing compressed data codes from a sequence of arrays of pixel values, each of said arrays of pixel values representing a frame of a moving image, said pixel display values being encoded in a predetermined sequence of positions within each array of pixel values, each compressed data code representing one or more pixel values extending from a current position within said predetermined sequence of positions, said method comprising the steps of:

(i) searching through previously compressed pixel values from a preceding frame to identify one or more preceding frame pixel values matching one or more pixel values at a current position within an array of pixel values being compressed and in response to such identification generating a temporal copy code for controlling copying of said preceding frame pixel values to said current position upon subsequent decompression;

(ii) searching through previously compressed pixel values from that frame currently being compressed to identify one or more current frame pixel values matching one or more pixel values at a current position within an array of pixel values being compressed and in response to such identification generating a spatial copy code for controlling copying of said current frame pixel values to said current position upon subsequent decompression; and (iii) generating a new pixel code representing any non-matching pixel to be compressed that cannot be represented by a temporal copy code and a spatial copy code, said new pixel code specifying pixel appearance.

* * * * *